3,770,774
PROCESS FOR PURIFYING CRUDE CHLORO-
METHYL DIHYDROSAFROLE AND PIPERONYL
BUTOXIDE THEREFROM
Herbert R. Jenkins and Harry M. Iwata, Baltimore, and
Asadollah A. Jabbarpour, Catonsville, Md., assignors
to FMC Corporation, New York, N.Y.
No Drawing. Filed Nov. 19, 1970, Ser. No. 91,179
Int. Cl. C07d 13/10
U.S. Cl. 260—340.5                3 Claims

ABSTRACT OF THE DISCLOSURE

Light-colored chloromethyl dihydrosafrole, capable of reacting with light-colored sodium butyl Carbitolate in the substantial absence of air at low temperatures to form piperonyl butoxide which can be recovered as a bottom product, is made by dissolving conventional dark-colored chloromethyl dihydrosafrole away from the color bodies with an alkane or cycloalkane of substantially lower boiling point than chloromethyl dihydrosafrole.

BACKGROUND OF THE INVENTION

Piperonyl butoxide

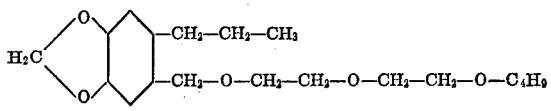

has been the principal synergist used with pyrethrins in household insecticides since its discovery by Wachs in the late 40's—see U.S. Pats. 2,485,680 and 2,485,681, issued Oct. 25, 1949. Its coaction with pyrethrins is described in Wachs U.S. Pat. 2,559,737, issued May 1, 1959.

The standard procedures heretofore used for making the product are described by Wachs and Forman in U.S. Pats. 2,878,265 and 2,878,266, issued Mar. 17, 1959. This method involves chloromethylation of dihydrosafrole with concentrated hydrochloric acid and formaldehyde, using either HCl gas and aqueous formaldehyde, or concentrated (37%) HCl and a nonaqueous formaldehyde polymer such as paraformaldehyde, in such quantity that the molar concentration of hydrogen chloride at the end of the reaction is about 7.5 to 9.5. Temperatures of 60 to 90° C. are used. Calcium chloride may be used (U.S. Pat. 2,878,-266) to reduce the necessary molar concentration of hydrogen chloride to the range of 5.5 to 8.0. The product chloromethyl dihydrosafrole is separated from the aqueous layer, and condensed with an alkali metal salt of butyl Carbitol (diethylene glycol monobutyl ether) at 80 to 120° C.; the piperonyl butoxide is washed with water to remove the salt formed in the condensation and finally fractionally distilled at 2 mm. vacuum, at 195° C., to get first excess butyl Carbitol and then product.

This process, while it has been successfully practiced commercially for many years, has one great disadvantage. The high-temperature vacuum distillation at the end of the process is not only expensive to operate, but it results in reducing the yield of product by tar formation, and presents a waste-disposal problem, since the tars have no value. It has been impossible to utilize the product without distillation, because of its dark color as produced in the process.

OBJECTS OF THIS INVENTION

This invention aims to provide a process for producing piperonyl butoxide which is of sufficiently good color so that it can be utilized without the necessity for distillation of product, and hence with higher yields and elimination of tar production. It is a further object of this invention to provide a process for making chloromethyl dihydrosafrole light enough in color to be useful in making such a bottom product.

STATEMENT OF THE INVENTION

We have discovered that the color bodies formed in conventional chloromethylation of dihydrosafrole are insoluble in volatile liquid alkanes and cycloalkanes which are solvents for chloromethyl dihydrosafrole, so that they can be largely separated by adding enough solvent to the crude product to dissolve the chloromethyl dihydrosafrole and precipitate the impurities, which can then be separated and washed free of product. Residual traces of color are removed from the solution with a conventional carbon or similar decolorizing treatment. By using a solvent which has a boiling point well below that of chloromethyl hydrosafrole (180° C. at 1 mm. Hg), separation of solvent from product is made easy by simple distillation. The chloromethyl product is then condensed with an alkali metal butyl Carbitolate at temperatures not in excess of 50° C. in the absence of oxygen.

The reaction mixture is neutralized as necessary, washed, and the butyl Carbitol distilled overhead under vacuum at a pot temperature high enough to remove the butyl Carbitol without any piperonyl butoxide. Piperonyl butoxide is recovered as bottom product in an over-all yield of 90 to 93% of good color, and of high (95 to 97%) purity as evident by gas chromatography.

DETAILED DESCRIPTION OF THE INVENTION

We use, as the starting point for our process, crude chloromethyl dihydrosafrole obtained in any known fashion, most preferably by the processes disclosed by Wachs and Forman in U.S. Pats. 2,878,265 and 2,878,266. This crude chloromethyl dihydrosafrole is dark in color, and, when condensed with sodium butyl Carbitolate in known fashion, produces a product which must be distilled to get acceptable color.

In accordance with this invention, we treat this crude product to remove the color bodies, to produce a light-colored material which can be condensed with light-colored sodium butyl Carbitolate, under proper conditions, to piperonyl butoxide of good color, which can be recovered without distillation thereof.

We mix our crude with a liquid alkane or cycloalkane solvent which has a boiling point substantially lower than that of chloromethyl dihydrosafrole, using at least 3 volumes of solvent per volume of crude, to dissolve the desired product and precipitate color bodies from the crude. Larger quantities of solvent can be used, at the cost of recovery by simple distillation from product.

The solvent used may be any liquid alkane or cycloalkane of the right boiling point. Convenient solvents range from the pentanes to the kerosenes and similar aliphatic petroleum distillates, as well as cyclohexane, cyclooctanes and the like.

The treatment is preferably carried out at ambient temperatures for economic reasons. Lower temperatures can be used if desired; temperatures above 110° C. should be avoided to optimize tar precipitation. The precipitated color bodies are separated from the liquid phase, and washed with solvent to recover adhering product.

The traces of color which are entrapped in the liquid are removed with carbon, silica gel or other standard treatment for removing traces of color. After this treatment, the solvent is simply boiled away from the product.

In making piperonyl butoxide, this intermediate is then reacted with an alkali metal butyl Carbitolate, preferably sodium butyl Carbitolate

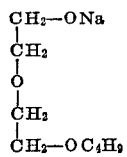

prepared from butyl Carbitol and 50% caustic soda in any such manner that it is of good color. Such methods are described and claimed in our copending application entitled "Manufacture of Light-Colored Alkali Metal Butyl Carbitolate, and Piperonyl Butoxide Therefrom," filed Nov. 19, 1970, Ser. No. 91,180.

The chloromethyl intermediates may be fed into the Carbitolate, or the two run together into a reaction vessel, depending on whether the process is run as a batch process or continuously. The reaction temperature is held at or below 50° C. during the addition, and oxygen is excluded. An inert-gas blanket is again used, for color prevention. The reaction is mildly exothermic; once the addition is completed, batches are allowed to stand for about 2 hours without heat, generally cooling down to ambient temperatures by then. Water is then run into the batch, to remove the salt formed. Since excess sodium butyl Carbitolate must be used to push the condensation to completion, sufficient acid is added to get the pH down to about neutral (about 6.5 to 7.5) during the washing operation.

After removing the water, the product is run into a still. A simple pot vacuum still is all that is required. Since the piperonyl butoxide is much higher boiling than butyl Carbitol, it is easily stripped at any conventional temperature and vacuum which will remove the butyl Carbitol—for example, 100 to 120° C. at 2 mm. Hg. Temperatures above 100° C. should be avoided, to insure against formation of color.

SPECIFIC EXAMPLES OF THE INVENTION

The following examples of the invention are given by way of illustration and not by way of limitation.

Example 1

64.3 gm. of colored chloromethyl dihydrosafrole (CMC) was diluted to 15% CMC with hexane. The mixture was allowed to stand for ½ hour, after which the tars were removed and washed three times with 10-ml. portions of hexane. A 50/50 mixture of carbon powder and 30 mesh granules was added in the ratio of 0.5 gm. of carbon per gram of CMC. The solution was stirred for 1 hour, after which it was filtered and the carbon cake was washed three times with 25-ml. portions of hexane. The hexane was vacuum-stripped from the CMC at 40° C. and 10 mm. Hg.

Initial color—black,
Purity—87.2%,
Recovery—85% at 96.2% purity,
Color—light yellow.

Example 2

100 gm. of plant-produced CMC, dark in color, was diluted with heptane to 25% CMC and allowed to stand 1 hour. A tar formation precipitated and was removed by filtration. A 50/50 mixture of Celite and Syloid 72 (W. R. Grace & Co.) was added in the ratio of .04 gm. per gram of CMC. The solution was agitated for 3 hours, then filtered. The heptane was removed under vacuum.

Purity—95%,
Color—yellow.

Example 3

Example 2 was repeated, using hexane.

Purity—92%,
Recovery—89%,
Color—yellow.

Example 4—Preparation of sodium butyl Carbitolate 250 gm. of butyl Carbitol was added to a 500-ml. round-bottom flask with agitation. 50 gm. of 50% caustic was charged to the flask along with 3 gm. of ethylene diamine. The reaction mix was placed under 10 mm. Hg and agitated. After the initial $H_2O$ boiled off, the flask was heated to 130° C.

Analysis of sodium salt:

$H_2O$—0.03%,
Free caustic—0.05%,
Sodium butyl Carbitolate—54.3%.

Two additional batches of sodium salt were made, and added to the above batch. Final assay—54.0% sodium salt.

Example 5

Replacement of sodium hydroxide with equivalent weights of potassium hydroxide gave an essentially similar end product.

Example 6—Preparation of butoxide 500 gm. of the 54.0% sodium butyl Carbitolate made as in Example 4 was charged to a 1-liter round-bottom flask with agitation and $N_2$ purge. The flask was placed in a bath at 10° C. CMC prepared as in Example 1 (300 gm.) was added at a rate to maintain the reaction temperature below 50° C. After addition, the mixture was agitated for 2 hours at room temperature. The solution was taken to pH 7 with HCl. 300 ml. of $H_2O$ was added with agitation. The $H_2O$ layer was then separated and vacuum-stripped with butyl Carbitol at 2 mm. Hg until a pot temperature of 130° C. was reached.

Purity—95.1% (blue color),
Recovery—440 gm.
Color—4.0,
$H_2O$—0.03.

Obviously, the examples can be multiplied indefinitely, without departing from the scope of the invention as defined in the claims.

What is claimed is:

1. The method of producing chloromethylated dihydrosafrole of good color from the crude product containing tarry impurities obtained by chloromethylation of dihydrosafrole at 60 to 90° C. in aqueous medium with hydrochloric acid and formaldehyde in such quantity that the molar concentration of hydrogen chloride at the end of the reaction is 5.5 to 9.5, and mechanically separating the crude product from the aqueous material, which comprises mixing the crude product with at least three times its volume of a liquid alkane or cycloalkane having a boiling point sufficiently below that of the chloromethylated dihydrosafrole to be readily distilled away from it and holding the solution at a temperature not in excess of 110° C. whereby the chloromethylated dihydrosafrole is dissolved and the tars are precipitated, mechanically separating the solution from the tars, and distilling the liquid alkane or cycloalkane from the solution to obtain a residue of decolorized chloromethylated dihydrosafrole.

2. The method of claim 1, in which the solvent is a lower liquid alkane selected from the group consisting of hexanes and heptanes.

3. The method of claim 1, in which the solution is treated with a decolorizing agent of the group consisting of active carbon and active silica after precipitation and separation of tars, to remove occluded color bodies.

References Cited

UNITED STATES PATENTS

| 2,421,569 | 6/1947 | La Forge et al. | 260—340.5 |
| 2,485,600 | 10/1949 | Hedenburg | 260—340.5 |

ALEX MAZEL, Primary Examiner

J. H. TURNIPSEED, Assistant Examiner

UNITED STATES PATENT OFFICE
CERTIFICATE OF CORRECTION

PATENT NO. : 3,770,774
DATED : November 6, 1973
INVENTOR(S) : Herbert R. Jenkins, Harry M. Iwata and Asadollah A. Jabbarpour It is certified that error appears in the above-identified patent and that said Letters Patent are hereby corrected as shown below:

Column 3, line 47, "100° C" should read "160° C".

Signed and Sealed this twenty-ninth Day of June 1976

[SEAL]

Attest:

RUTH C. MASON
Attesting Officer

C. MARSHALL DANN
Commissioner of Patents and Trademarks